W. L. FISH.

LAMP-CHIMNEY.

No. 7,069. Reissued April 18, 1876.

Witnesses

Evell A. Dick

Joseph Wiedman

Inventor:

The Kerosene Lamp Heater Co. assignee of Warren L. Fish by affy.

Pollok & Bailey

N. PETERS, Photo-Lithographer, Washington, D. C.

UNITED STATES PATENT OFFICE.

WARREN L. FISH, OF NEWARK, NEW JERSEY, ASSIGNOR, BY MESNE ASSIGNMENTS, TO THE KEROSENE-LAMP HEATER CO., OF NEW YORK CITY.

IMPROVEMENT IN LAMP-CHIMNEYS.

Specification forming part of Letters Patent No. 35,598, dated June 17, 1862; reissue No. 1,368, dated December 23, 1862; reissue No. 1,596, dated January 5, 1864; reissue No. 7,069, dated April 18, 1876; application filed April 5, 1876.

*To all whom it may concern:*

Be it known that WARREN L. FISH, of Newark, in the county of Essex and State of New Jersey, has invented new and useful Improvements in Kerosene-Oil-Lamp Heaters, of which the following is a specification, reference being had to the accompanying drawing, in which—

Figure 1:
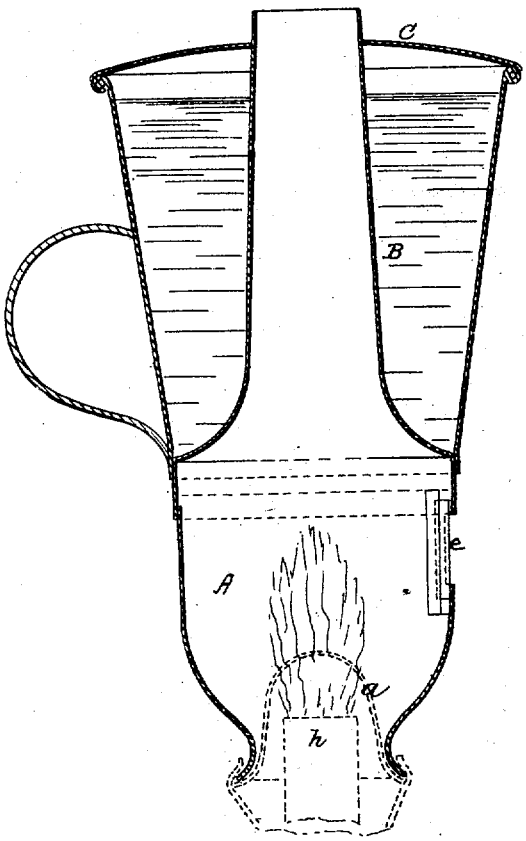
Figure 2:
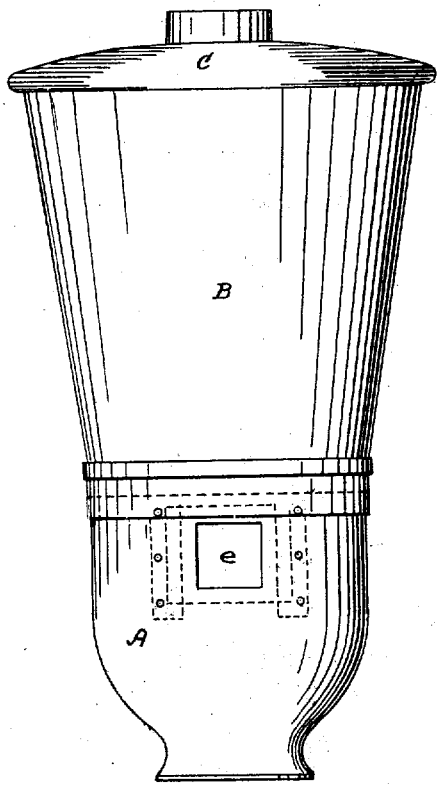

Figure 1 represents a vertical central section of an apparatus made in accordance with this invention, and Fig. 2 a side elevation of the same.

This invention has for its object the utilization of the heat of the illuminating-flame of kerosene-oil lamps; and it consists, first, in the combination, substantially as hereinafter shown and described, of a kerosene-oil-lamp deflector or cone and a metallic heating chamber or shell adapted to support a vessel to be heated; second, and further, in a kerosene-oil-lamp heater in which the deflecter or cone of the lamp is arranged in the bottom of the metallic heating chamber or shell that is adapted to support the vessel to be heated; third, and further, in the combination of a kerosene-oil lamp, a deflector or cone, and a metallic heating-chamber under the arrangement, substantially as hereinafter shown and described, so that the air for the sustenance of the flame in the heater shall be admitted through the bottom of the heater, and the products of combustion shall pass off through a contracted opening in the top of the heater; fourth, and further, in the combination of a kerosene-oil lamp, a metallic shell adapted to support a vessel to be heated, and a window made of transparent material in the walls of the shell, substantially as hereinafter set forth.

The accompanying drawing represents an apparatus embodying this invention, and will now be referred to.

A is a metallic heating chamber, bulb, or shell, at whose bottom or lower end is a slotted cone or deflector, *a*, through which passes into the interior of the heater the flame from the wick-tube *h* of the kerosene-oil lamp. The rest of the lamp and lamp-burner—that is to say, the base, perforated air-admitting diaphragm, and wick-raising shaft and pinions, as well as the oil-vessel—are not represented, inasmuch as their construction is a matter of common understanding.

The bottom or lower end of the heating-chamber is closed, as shown, except at the point of opening in the deflector or cone. The metallic heating-chamber or shell serves as a chimney or flue as well. It is formed at the top to support over the flame a vessel to be heated, which at any time desired can be removed from or placed on the said chamber or shell.

The heating-vessel in the drawing is marked B. It may be of a cylindrical or any other convenient or suitable form, and contains in its interior a flue which constitutes a continuation of the shell or chamber A. This flue is soldered at its base, *i. e.*, at its flare-mouthed extremity to the under side of the vessel, so as to leave a small rim to project from its under side, whereby it can fit on the bulb or shell. The flue, which is contracted to better produce a draft, extends upward throughout the whole height and beyond the top of the vessel, so that water or other liquid, which may be placed in the vessel, shall thereby be excluded from the burner and lamp. The vessel, to complete it, is provided with a cover, C, through the central orifice of which the flue passes. The bulb or shell is made of metal, to give it the strength necessary to support the heating-vessel. The light emitted by the flame may be used at the time its heat is being utilized. For this purpose the bulb or shell is provided with a window, *e*, made of mica, or other suitable transparent substance.

By this arrangement not only can the flame from without be observed, but light may be admitted into the room.

What is claimed as the invention of WARREN L. FISH is as follows:

1. The combination, substantially as herein shown and described, of a kerosene-oil lamp, deflector or cone, and a metallic heating chamber or shell, adapted to support a vessel to be heated.

2. A kerosene-oil-lamp heater in which the deflector or cone of the lamp is arranged in the bottom of a metallic heating-chamber or shell that is adapted to support the vessel to be heated.

3. The combination of a kerosene oil lamp, a deflector or cone, and a metallic heating-chamber under the arrangement, substantially as herein shown and described, so that the air for the sustenance of the flame in the heater shall be admitted through the bottom of the heater, and the products of combustion shall pass off through a contracted opening in the top of the heater.

4. The combination of a kerosene-oil lamp, a metallic shell adapted to support a vessel to be heated, and a window made of transparent material in the walls of the shell, substantially as herein set forth.

In testimony whereof I have hereunto set my hand and affixed the seal of said company this 3d day of April, A. D. 1876.

WILLIAM D. RUSSELL. [L. S.]
*President of the Kerosene-Lamp Heater Co.*

Witnesses:
W. L. BENNEM,
W. H. ISAACS.